April 10, 1928.  1,665,895
L. RIEGER
SHAFT COUPLING
Filed June 28, 1920
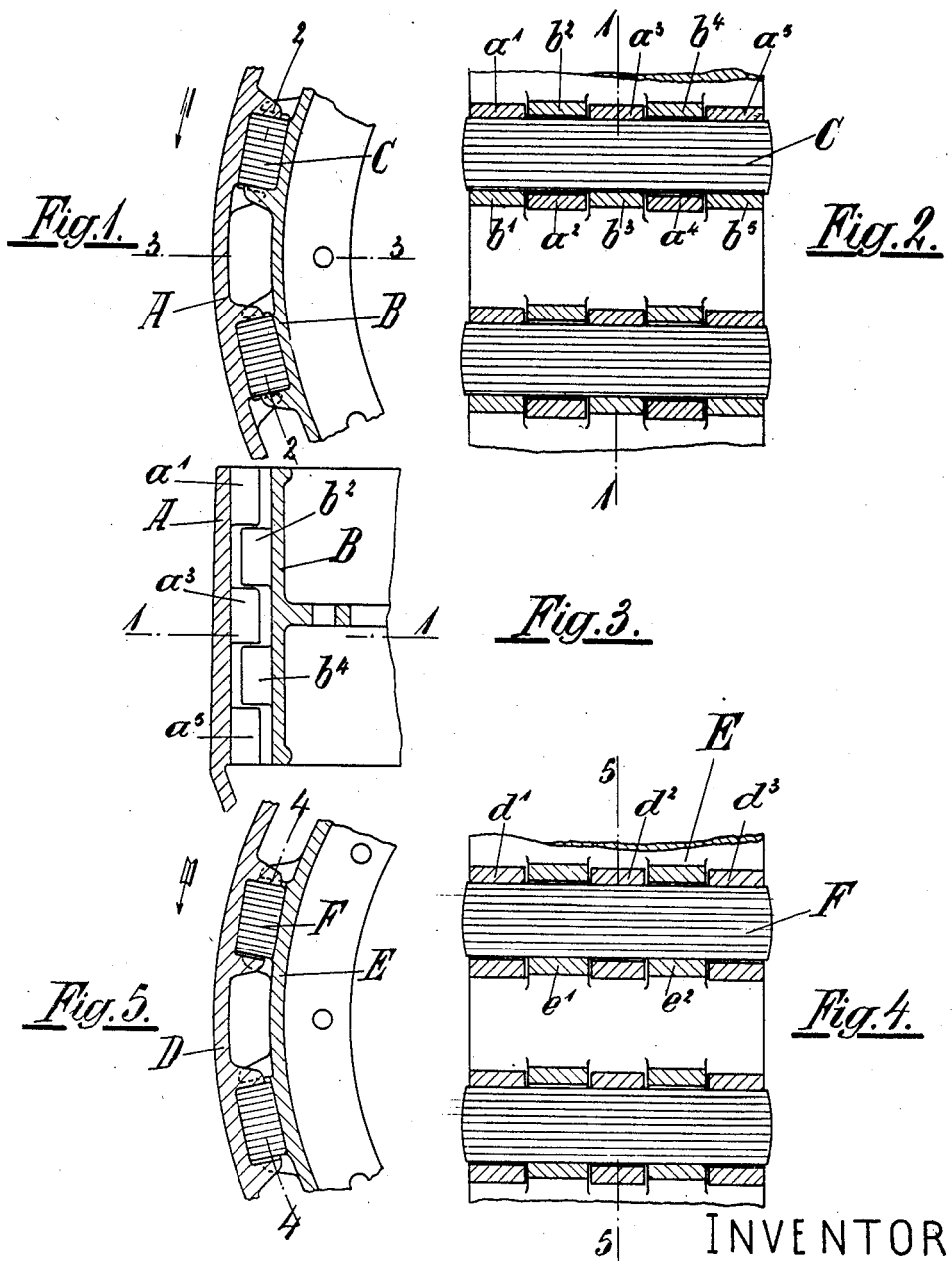
INVENTOR:
Lenz Rieger Patented Apr. 10, 1928.

1,665,895

UNITED STATES PATENT OFFICE.

LEONZ RIEGER, OF FRIEDRICHSHAFEN, GERMANY, ASSIGNOR TO THE FIRM LUFT-SCHIFFBAU ZEPPELIN GESELLSCHAFT MIT BESCHRANKTER HAFTUNG, OF FRIEDRICHSHAFEN, GERMANY.

SHAFT COUPLING.

Application filed June 28, 1920, Serial No. 392,436, and in Germany May 22, 1919.

(GRANTED UNDER THE PROVISIONS OF THE ACT OF MARCH 3, 1921, 41 STAT. L., 1313.)

My invention refers to permanent elastic shaft couplings and more especially to the construction of such couplings in which elastic intermediate pieces subjected to pressure are arranged in corresponding hollows of coupling rims surrounding each other in a ring-shaped manner. The elastic couplings hitherto known on the one hand do not completely utilize the spring power of the intermediate pieces, on the other hand the latter are mostly subjected to strain in an unfavourable manner. Either a heavy type of construction or a speedy destruction of the intermediate pieces is the consequence. It is the object of the invention under discussion to do away with these drawbacks by giving a special formation to the coupling rims. According to the invention the tooth-like protrusions of the inner and outer rims which serve as abutments for the intermediate pieces, are at least extended nearly up to the ground surface of the rim opposite in each case so that every intermediate piece in its total radial constructional height is subjected to the full abutment pressure of the inner as well as the outer rim. Besides that, according to the invention, every abutment surface opposed to a pressure surface of an intermediate piece is divided several times in the direction of the axis of the coupling and is formed alternately by the protrusions of both rims. In consequence of the repeated and regular sequence of hollows and teeth of each rim supplementing each other, a distribution of pressure adaptable to all conditions as the exigencies may require, and therefore a most favourable straining of the intermediate pieces are attained without trouble. Besides that, the proportion between the power normally to be transmitted with the machine working forwards and the load on the machine in running backwards can be taken into consideration in the most extensive measure.

The drawing attached to this specification and forming part thereof, in Figs. 1–3 on the one hand and Figs. 4 and 5 on the other hand illustrates two especially advantageous couplings by way of example.

Fig. 1 is a cross-section in the plane 1—1 of Fig. 2 of a part of the rim, developed in the plane of drawing.

Fig. 3 is an axial section in the plane 3—3 of Fig. 1, whilst

Fig. 4 is a cross-section of the rim corresponding to Fig. 2 in the plane 4—4 of Fig. 5 and Fig. 5 is a cross-section of a part of the rim of the other coupling in the plane 5—5 of Fig. 4 and corresponding to Fig. 1.

In Figs. 1–3 the two coupling rings are marked A and B. The outer rim A bears the teeth $a^1 \ldots a^5$; the teeth of the inner rim—generally speaking the driven part of the coupling, are marked $b^1 \ldots b^5$. The intervening spaces between the abutment surfaces of the teeth are filled with the elastic layers C. In the outer rim the first row has three teeth $a^1$, $a^3$, $a^5$, the next one two, $a^2$, $a^4$, etc. Correspondingly in the inner rim rows of two teeth $b^2$, $b^4$ and of three teeth $b^1$, $b^3$, $b^5$ follow each other. The teeth working together are exactly opposite one another in equal number in each case. In the forward motion indicated in Fig. 1 by the arrow, three teeth $a^1$, $a^3$, $a^5$ of the outer rim together with three teeth $b^1$, $b^3$, $b^5$ of the inner rim working in pairs corresponding to the division of the breadth of the rim into five parts chosen in the example, take the load. In working backwards only two pairs of surfaces, $a^2$, $b^2$, $a^4$ and $b^4$ may take the load. For rotation in forward direction therefore one pair of surfaces more to take the load is available than in rotation backwards, which, generally speaking, for instance complies with the circumstances in air-craft motors. If the axial dimension of the teeth $a^2$, $b^2$, $a^4$, $b^4$ is chosen differently from that of the other teeth, the coupling can be adapted in a still greater measure to the special circumstances arising from the backward or forward motion.

In Figs. 4 and 5 the teeth of the outer rim D are marked $d^1$, $d^2$, $d^3$ and those of the inner rim E with $e^1$, $e^2$, the intermediate pieces are marked F. As compared with the first example there is an important difference in the sequence of the teeth. The teeth of the outer rim follow on each other in unchanging rows of three each, the teeth of the inner rim in rows of two. The teeth working together therefore are no longer exactly opposite one another. In both directions of rotations three teeth of the outer rim work together with two of the inner rim through the intermediate pieces.

Each of the two modifications shows special advantages. Whilst the first one with teeth accurately opposed to one another offers altogether the most favourable utilization of the elastic intermediate layers, the manufacture is particularly simple in the second case owing to the equal sequence of the protrusions of each rim throughout. In this case also the utilization of the elastic layers is still considerably more favourable than in the types of elastic couplings with rims surrounding one another in a ring-like manner hitherto known.

The two constructional examples discussed are, generally speaking, the most advantageous. However, under special circumstances still other divisions can offer advantages. For instance, even with an uneven number of teeth and with teeth accurately opposing each other in accordance with the example in Figs. 1–3 a perfectly equal number of pressure surfaces can be provided for the forward as well as the backward motion. The sequence of the teeth of the one rim must in this case change in regular repetition from one intermediate piece to another. An even number of divisions of the breadth generally speaking calls forth a shifting of the center of pressure in regard to the axis of symmetry. But this influence on the whole can also be balanced by changing the sequence of the teeth from one intermediate piece to the next.

I claim:

1. An elastic coupling comprising two concentric rims, one within the other; inwardly extending projections on the outer rim; outwardly extending projections on the inner rim; said projections being arranged in axially extending rows, the projections of a row on one rim fitting in the gaps between the projections of the corresponding row on the other rim, and in circumferential direction the projections on the outer rim alternating with those on the inner rim; and a non-metallic compressible band axially extending between the projections of the outer and of the inner rim.

2. An elastic coupling comprising two concentric rims, one within the other; two series of axially extending rows of outwardly directed teeth on the inner rim, said two series of rows alternating on the circumference of said inner rim, and differing from each other in that one series always has a tooth where the other series has a gap; two series of axially extending rows of inwardly directed teeth on the outer rim, said two series of these rows alternating on the circumference of said outer ring and differing from each other in that one series always has a tooth where the other series has a gap; said teeth on the inner rim being so arranged as to fit between the teeth of said outer rim, said outer and said inner teeth together forming composed bars extending axially between said two rims; and a non-metallic compressible band extending axially between two of said composed bars.

In testimony whereof I affix my signature.

LEONZ RIEGER.